United States Patent
Rodgers et al.

(10) Patent No.: US 6,769,746 B2
(45) Date of Patent: Aug. 3, 2004

(54) ENDLESS TWO PART RUBBER TRACK COMPRISED OF POLYURETHANE BASED TREAD COMPONENT AND RUBBER CARCASS COMPONENT AND VEHICLE CONTAINING SUCH TRACK

(75) Inventors: Michael Brendan Rodgers, Copley, OH (US); Bina Patel Botts, Stow, OH (US); Ram Murthy Krishnan, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 25 days.

(21) Appl. No.: 10/193,387

(22) Filed: Jul. 11, 2002

(65) Prior Publication Data

US 2003/0094854 A1 May 22, 2003

Related U.S. Application Data

(60) Provisional application No. 60/311,773, filed on Aug. 10, 2001.

(51) Int. Cl.$^7$ ............... B62D 55/24; B62D 55/275; F16G 1/00; B64C 25/00
(52) U.S. Cl. .............. 305/166; 305/165; 305/178
(58) Field of Search ..................... 305/165–167, 305/170, 178, 60

(56) References Cited

U.S. PATENT DOCUMENTS

| | | | | |
|---|---|---|---|---|
| 3,480,339 A | * | 11/1969 | Kell | 305/166 |
| 4,095,637 A | * | 6/1978 | Krishnan | 152/323 |
| 4,104,265 A | * | 8/1978 | deZarauz | 525/68 |
| 4,669,517 A | * | 6/1987 | Krishnan | 152/209.5 |
| 6,255,431 B1 | * | 7/2001 | Fishback et al. | 528/44 |
| 6,273,163 B1 | | 8/2001 | Materne et al. | 152/548 |
| 6,296,329 B1 | * | 10/2001 | Rodgers et al. | 305/165 |
| 6,352,320 B1 | * | 3/2002 | Bonko et al. | 305/178 |
| 6,554,377 B2 | * | 4/2003 | Yovichin et al. | 305/165 |

FOREIGN PATENT DOCUMENTS

| | | | |
|---|---|---|---|
| GB | 2229410 | 9/1990 | B62D/55/24 |
| JP | 55140662 | 11/1980 | B62D/55/24 |
| JP | 5170148 | 7/1993 | B62D/55/253 |
| JP | 6166389 | 6/1994 | B62D/55/253 |

OTHER PUBLICATIONS

U.S. 2003/0080618 A1, Krishnan et al, May 1, 2003, entire document.*

"Millathane HT®, A High Temperature Resistant Polyurethane" brochure by TSE Industries, 5260 113$^{th}$ Avenue North, Clearwater, Florida 34620, a RheinChemie Corporation.

"Millathane 76®, A Millable Urethane Elastomer" brochure by TSE Industries, 5260 113$^{th}$ Avenue North, Clearwater, Florida 34620, a RheinChemie Corporation.

"Millathane E34®, A High Performance Polyether Polyurethane Rubber" information sheet by TSE Industries, 5260 113$^{th}$ Avenue North, Clearwater, Florida 34620, a RheinChemie Corporation.

* cited by examiner

Primary Examiner—S. Joseph Morano
Assistant Examiner—Jason R. Bellinger
(74) Attorney, Agent, or Firm—Henry C. Young, Jr.

(57) ABSTRACT

The invention relates to a two part endless vehicular rubber track comprised of a polyurethane based tread component and a rubber carcass component. In one aspect, the tread component may be comprised of a sulfur curable polyurethane or blend of sulfur curable polyurethane and sulfur curable elastomer. The invention includes a vehicle containing such track.

11 Claims, 2 Drawing Sheets

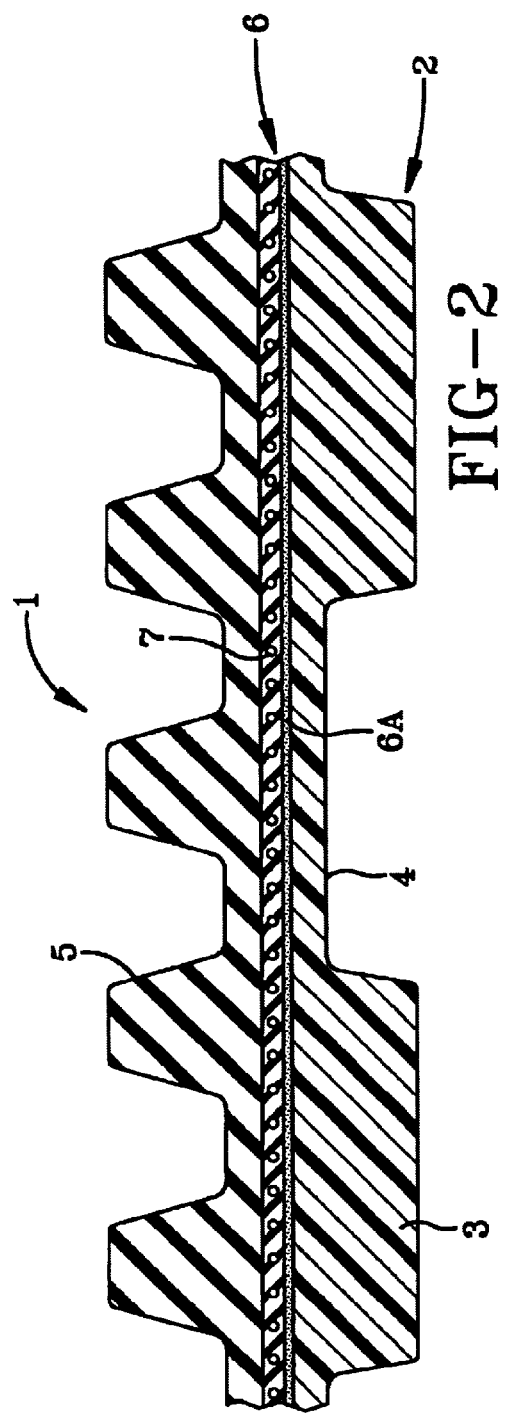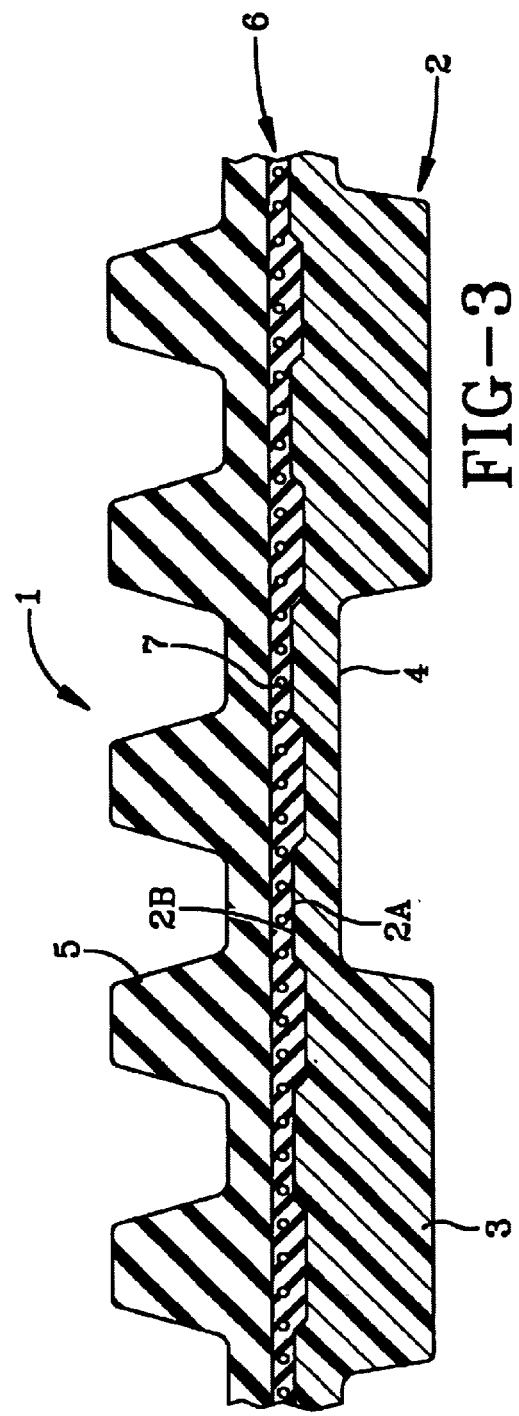

Figure 1:
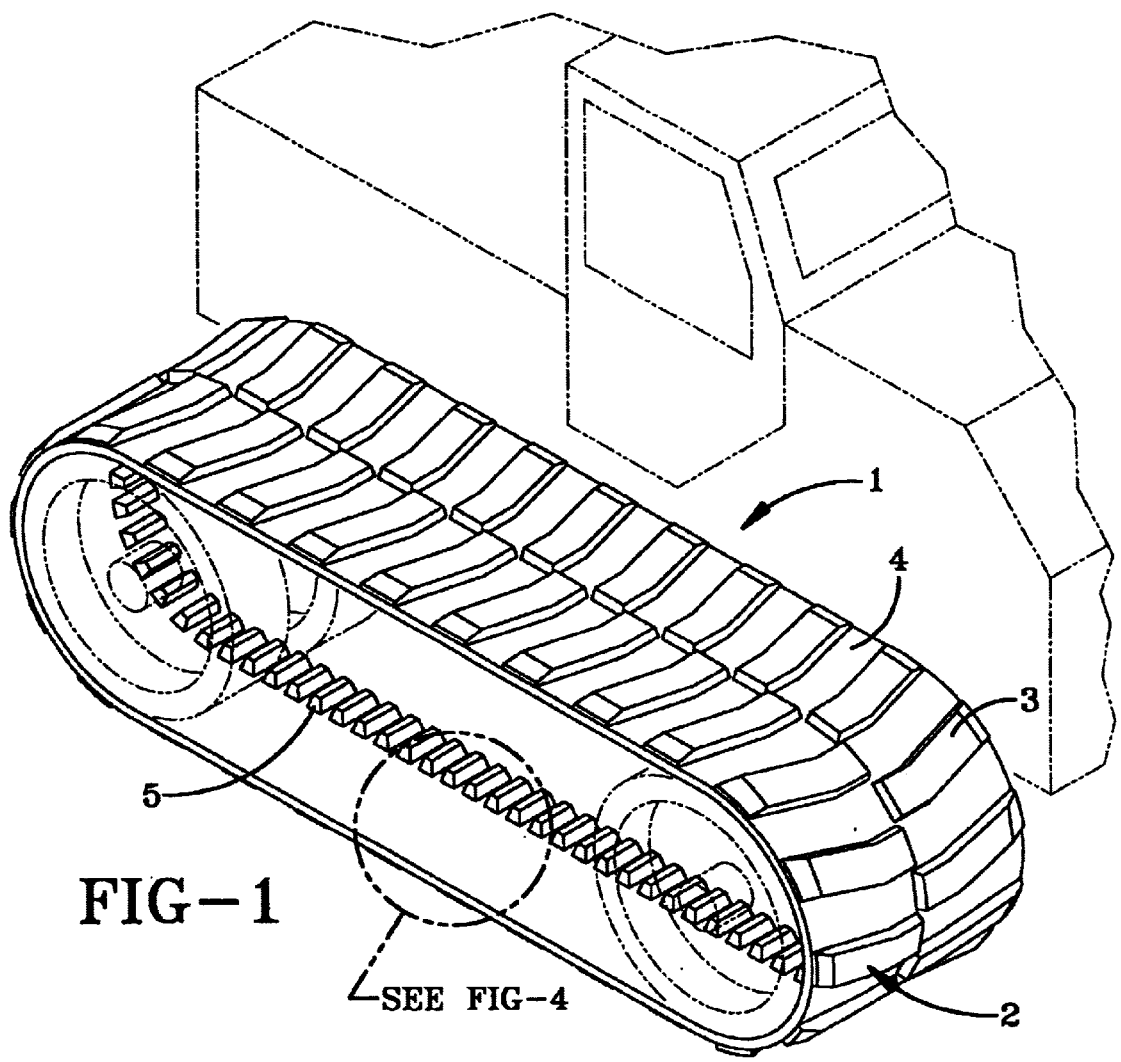

ENDLESS TWO PART RUBBER TRACK COMPRISED OF POLYURETHANE BASED TREAD COMPONENT AND RUBBER CARCASS COMPONENT AND VEHICLE CONTAINING SUCH TRACK

The Applicants hereby incorporate by reference prior U.S. Provisional Application Serial No. 60/311,773, filed on Aug. 10, 2001.

FIELD OF THE INVENTION

The invention relates to a two part endless vehicular rubber track comprised of a polyurethane based tread component and a rubber carcass component. In one aspect, the tread component may be comprised of a sulfur curable polyurethane or blend of sulfur curable polyurethane and sulfur curable elastomer. The invention includes a vehicle containing such track.

BACKGROUND OF THE INVENTION

Endless rubber tractor tracks are increasingly being used for propelling various vehicles over the ground such as, for example, various tractors and other agricultural vehicles including, for example, combines and spreaders, as well as various earth moving machines.

In particular, such track is conventionally positioned over at least two wheels, normally a drive wheel for engaging an inner surface of the track and driving the track and at least one driven wheel to control the path of the track as it moves to propel the associated vehicle. The outer surface of the peripheral tread configuration of the track typically contains a plurality of raised lugs designed for engaging the ground and assisting the propelling of the associated vehicle such as, for example, a tractor over an agricultural ground.

In practice, the tread of such rubber tracks provide a considerably wider footprint than conventional pneumatic tires and are, thereby, more adaptable to agricultural fields in that they offer better flotation and less soil compaction than rubber tires, which may result in better crop yield. In addition, use of rubber tracks instead of pneumatic tires may permit a farmer to get out into a field earlier in the planting season and plant crops sooner in point of time and may permit a harvesting of a crop on a more timely basis as compared to conventional pneumatic rubber tire equipped agricultural vehicles. Such use and advantages of rubber tractor tracks are well known to those having skill in such art.

Such rubber tracks are conventionally in a form of an endless rubber belt composed of a rubber carcass reinforced with continuous steel cables molded into the carcass rubber composition itself to add dimensional stability for the track and an integral outer rubber tread with raised lugs for ground-contacting purposes.

Polyurethane treads have sometimes been suggested for rubber tires. Such polyurethanes are typically a reaction product of a polyisocyanate (e.g. diisocyanate) and one or more polymeric polyols such as for example polyether polyols and/or polyester polyols. For example, rubber tires, pneumatic and solid, have been heretofore been proposed having a rubber carcass bonded to a polyurethane tread. For example, see U.S. Pat. Nos. 4,669,517 and 4,095,637.

Sulfur curable polyurethanes have been proposed as a reaction product of a polyisocyanate (e.g. diisocyanate) and polymeric polyols which contain a degree of unsaturation, particularly carbon-to-carbon double bond unsaturation. Such polyisocyanate may be, for example, a methylene bis(4-phenylisocyanate), or MDI, and the polymeric polyol may be a trifunctional active hydrogen compound-initiated polyoxyalkylene polyether polyol having a degree of unsaturation which may also include a polytetramethylene ether glycol. (For example see U.S. Pat. No. 6,255,431 where a trifunctional agent is used with a polyol with an imparted unsaturation is used to promote physical properties of the polyurethane).

Sulfur curable millable thermoplastic polyurethanes may also be used alone or as a blend with sulfur curable diene-based elastomers as a product of relatively equivalent amounts of polymeric polyol (e.g. polyester and/or polyether polyols) and a polyisocyanate (e.g. a diisocyanate such as for example MDI) which, in adding certain unsaturated carbon-to-carbon double bonds, usually in the polymeric polyol component of the polyurethane. Representative examples are, for example, polyether polyurethane rubber such as Millathane E34® and polyester polyurethane such as Millathane 76® from TSE Industries of Rheim Chemie, a Bayer Company.

Sulfur vulcanizable polyurethanes such as a product of a polyisocyanate (e.g. diisocyanate) and a liquid diene prepolymer and particularly a functional liquid diene prepolymer, which may be described in U.S. Pat. No. 4,104,265.

The purpose of this invention relates to a vehicular track comprised of two parts, namely a polyurethane based tread component designed to be ground-contacting (ground-engaging particularly for a farm implement) namely a tread component containing spaced apart lugs and an underlying rubber carcass component for supporting the tread component. For this invention, said track tread portion may be a polyurethane tread chemically bonded and/or physically interlocked to a rubber carcass.

It is contemplated that such a rubber track with a polyurethane tread configured with extended lugs, which is non-pneumatic, not intended for extensive highway use, intended for slow speed operation with minimal internal heat buildup within the polyurethane tread and where traction of the tread over the ground is primarily derived from its extended ground-engaging lugs rather than being primarily derived from the polyurethane composition itself has merit.

Most all of such above properties are not normally experienced by pneumatic passenger tires so that application of a polyurethane tread to the rubber carcass of a vehicular track is believed to be unique.

In the description of this invention the terms "cured" and "vulcanized" if used are used interchangeably. The term "phr" relates to parts by weight of a material per 100 parts by weight of rubber. The terms "rubber" and "elastomer" are used interchangeably unless otherwise noted.

SUMMARY AND PRACTICE OF THE INVENTION

In accordance with this invention, an endless rubber track designed to encompass at least one drive wheel and at least one driven wheel of an associated vehicle is provided wherein said track is a two part track comprised of a polyurethane based outer tread component having an outer surface and an opposing inner surface and an underlying rubber carcass component having an inner surface and an opposing outer surface, wherein said tread outer surface is configured with raised, spaced apart lugs designed to be ground engaging, wherein said tread inner surface is chemically bonded to and/or physically interlocked with, said carcass inner surface and wherein said carcass outer surface is designed to engage at least one of said drive wheels and/or driven wheels of said vehicle.

In one aspect of the invention, said polyurethane tread is chemically bonded to said underlying rubber carcass by an adhesive layer positioned between said tread inner surface and said carcass inner surface to bond said polyurethane tread and said rubber carcass together.

In practice, said diene-based rubber for said polyurethane tread blend can be, for example, a elastomeric polymer of isoprene and/or 1,3-butadiene and/or elastomeric copolymer of styrene with isoprene and/or 1,3-butadiene.

Representative examples of such rubbers are, for example, cis 1,4-polyisoprene cis 1,4-butadiene, styrene/butadiene copolymers isoprene/butadiene copolymers, styrene/isoprene copolymers and styrene/isoprene/butadiene terpolymer.

While various polyurethanes may be used, whether prepared by a one shot process or, preferably, by a pre-polymer process, sulfur curable polyurethanes are preferred which can be simple blended with typical rubber compounding ingredients (e.g. sulfur, etc) in an internal mixer in a manner similar to diene-based rubber compositions.

Sulfur curable polyurethanes can be of many forms which usually contain carbon-to-carbon double bonds therein to facilitate the sulfur curing thereof. Usually such double bonds are contained in the polyol component of the polyurethane.

While various diisocyanates might be used for the preparation of the polyurethane, sometimes diisocyanates which are considered to be non-discoloring might be desired, particularly where a colored track tread is desired (particularly if the desired color is other than a black color)

Representative of various isocyanates (e.g. diisocyanates) are, for example, methylene bis(4-phenylisocyanate) or MDI, 4,4'-diphenylmethane diisocyanate or TODI, trimethyl hexamethylene diisocyanate or TMDI, and hexamethylene diisocyanate or $H_{12}MDI$.

It may be desired to add a degree of trifunctionality to the polyurethane to improve various physical properties. This might be done, for example, by use of polymeric polyols with various degrees of difunctionality and trifunctionality.

Various polymeric polyols may be used for the polyurethane such as, for example polyester polyols, polyether polyols, polybutadiene polyols as well as functional liquid diene prepolymers (for example, see U.S. Pat. No. 4,104,265 which is incorporated herein in its entirety for its polyurethane preparation teaching)

The polyurethane for the tread component of the track may be comprised of a sulfur curable polyurethane which may be processed in a manner similar or the same as a sulfur curable elastomer, namely by mixing the sulfur curable polyurethane in an internal rubber mixer together with sulfur and other rubber compounding ingredients such as, for example reinforcing fillers such as, for example carbon black and precipitated silica. In practice, as hereinbefore discussed, such sulfur curable polyurethane may be blended with one or more sulfur curable diene-based elastomers to enhance the physical properties of the polyurethane based tread of the track.

It is to be appreciated that the polyurethane tread component of the two part track may be pre-formed by molding and curing a shaped tread having raised, spaced-apart lugs on its outer surface following affixed it to an at least partially pre-cured rubber carcass by chemically bonding and/or physically interlocking the sulfur cured polyurethane-based tread to the cured rubber carcass and curing the resulting assembly. Such chemical bonding may be accomplished, for example by interposing an adhesive layer between said tread and carcass and/or by chemically treating said tread and/or said carcass. Such physical interlocking may be accomplished, for example, by providing lugs and/or grooves in the surface of the rubber carcass and opposing grooves and/or lugs in the complementary surface of the tread. Accordingly, a combination of chemical bonding and physical interlocking may be used.

Alternatively, the polyurethane tread component of the two part track, particularly a sulfur curable polyurethane, may be formed directly onto the surface of said track rubber carcass component by casting a liquid polyurethane reaction mixture onto the a pre-cured carcass rubber surface and curing the polyurethane reaction mixture. The resultant polyurethane tread may be affixed to the surface of the tread rubber carcass by the aforesaid chemical bonding and/or physical interlocking of associated lugs and grooves.

Alternatively, said polyurethane tread component may be a sheet of a pre-formed polyurethane, particularly a sulfur curable polyurethane, which may have raised lugs on its outer surface, wherein said polyurethane sheet is chemically bonded (e.g. via an adhesive layer on its inner surface) and/or physically bonded (via lugs and/or grooves on its inner surface) to a pre-cured rubber carcass component of said track.

Alternatively, said polyurethane tread component may be applied as a sheet of a sulfur curable polyurethane to the surface a pre-cured rubber carcass component and the polyurethane sheet cured thereon in a suitable mold to impart a raised lug configuration on the outer surface of said polyurethane tread component designed to be ground-engaging.

In practice, for example, the inner surface of said polyurethane tread component may be physically interlocked with the outer surface of said track rubber carcass component by forming lugs and/or grooves on the inner surface of said polyurethane tread with corresponding, or complimentary, grooves and/or lugs on the outer surface of said track rubber carcass component which correspond to the inner surface of said polyurethane tread. This may be accomplished by first forming the polyurethane in a suitable mold such as for example, molding or by spin casting a liquid polyurethane reaction mixture in a suitable mold, curing the polyurethane mixture to form the tread, and applying the tread to a track rubber carcass or by casting the polyurethane reaction mixture directly onto the surface, which may be pre-coated with an adhesive, of the track rubber carcass and curing the polyurethane to from the polyurethane tread.

For an example of preparation of a polyurethane tread chemically bonded to a cured rubber tire carcass see U.S. Pat. No. 4,669,517 reference which is incorporated herein in its entirety.

For example, a composite of a polyurethane tread bonded to a surface of a cured rubber track carcass may comprise, for example:

(A) cleaning a surface of a cured rubber track carcass, said rubber having been prepared by sulfur curing a rubber composition containing from about 2 to about 10, alternately about 8 to about 12, phr of at least one hydroxyl terminated diene polyol selected from polybutadiene polyol and polyisoprene polyol, where said polyol is characterized by being liquid at 30° C., by having a hydroxyl functionality of about 1.5 to about 3, alternately about 2 to about 2.5, and a molecular weight (number average) in a range of about 2000 to about 4000, alternately about 2500 to about 3200; and where said rubber contains from zero to about 25, alternately about 20, phr of rubber processing oil;

(B) applying at least one coating to said cleaned rubber surface as a dispersion of cyanuric acid in a volatile organic diluent followed by drying the resultant coat to remove said diluent;

(C) applying at least one additional coating to said cyanuric acid coat as a solution comprising a phenol formaldehyde resole resin in a volatile organic solvent followed by drying the resultant additional coat(s) to remove the solvent;

(D) applying a pre-formed polyurethane tread or applying a liquid polyurethane reaction mixture to said coated rubber track surface; and (E) allowing said pre-formed polyurethane tread to adhesively bond to said rubber carcass or curing said polyurethane reaction mixture to form a composite of polyurethane tread chemically bonded to the cured rubber track carcass.

In practice, for example, said liquid polyurethane reaction mixture may be applied to said cured rubber track surface, which may be an adhesive coated surface, for example, by (1) flowing the liquid mixture onto a suitable mold cavity which contains the said rubber track carcass and/or (2) spin casting said liquid polyurethane reaction mixture onto the surface of the said rubber track by
   (a) spinning the cured rubber track around a liquid polyurethane ejecting means and/or
   (b) spinning a liquid polyurethane ejecting means around the cured rubber track.

It is to be appreciated that polyurethanes are conventionally prepared by a reaction of:

(A) polymeric polyol;
(B) polyisocyanate (e.g. diisocyanate); and, optionally
(C) curative (e.g. trimethanol propane, or TMP).

There are many variations of such reaction, depending largely upon the choice of reactants and additives. Such polymeric polyols may be, for example polyether polyols and/or polyester polyols or a polycaprolactam polyol. Such polymeric polyols are well known to those having skill in the preparation of polyurethanes.

Figure 4:
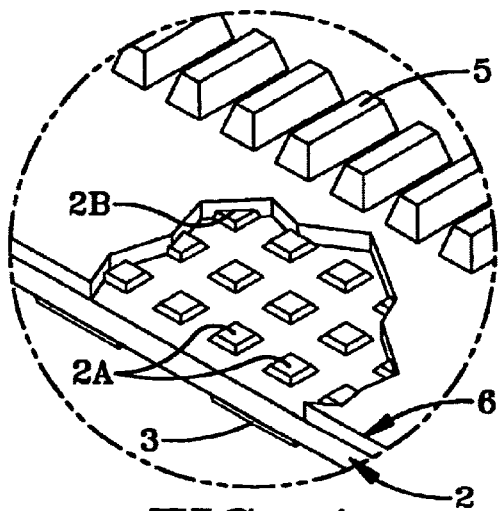
Figure 5:
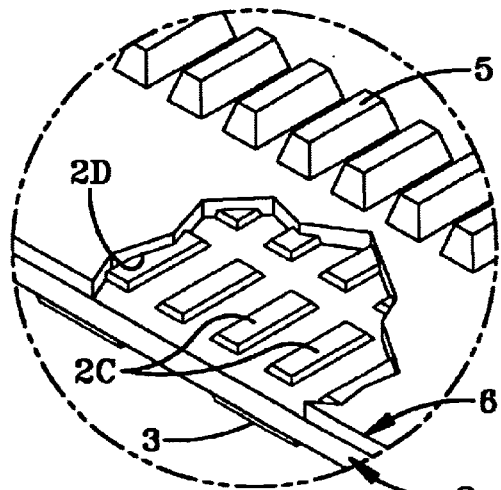

For a further understanding of this invention, the accompanying drawings are referred to in FIG. 1 which depicts a perspective view of a two part an endless rubber track composed of a tread component and a carcass component fitted to a vehicle with a drive wheel and a driven wheel, FIG. 2 and FIG. 3 depict a longitudinal cross-sectional views of such track, FIG. 4 and FIG. 5 are enlarged views of a portion of the two part track FIG. 1 depicting an alternative interface between the tread portion and carcass portion of said track.

In the drawings, a two part track (1) is provided having a rubber carcass component (6) and polyurethane based tread component (2), configured with raised spaced apart lugs designed to be ground-engaging (3) alternately also containing grooves (4) between said raised lugs (3). The polyurethane tread component (2), for example a sulfur curable or sulfur cured polyurethane, is affixed to the surface of the rubber carcass component (6) by bonding the polyurethane tread component and rubber carcass components together with an interfacial adhesive cement (6A) therebetween and, moreover, is physically interlocked with said rubber carcass component (6) by intermeshing lugs (2A) and/or (2C) on the inner surface of the polyurethane tread component (2) and complimentary grooves (2B) and or (2D) in the surface of the rubber carcass component (2). The interfacial raised lugs (2A) are depicted in a relatively square configuration and the interfacial lugs (2B) are depicted in a relatively rectangular configuration in order to inhibit slippage between said polyurethane tread component (2) and rubber carcass component (6) as longitudinal and/or transverse forces are experienced as the track (1) is operationally driven over the ground.

Raised lugs (5) positioned on the outer surface of the rubber carcass component (6) of the two part track (1) are also shown which can be engaged by an appropriate drive wheel of the vehicle to drive the two part track (1). Alternatively, the two part track (1) can be driven by a friction wheel.

The two part track (1) itself may be composed of the circumferential polyurethane-based tread component (2) which may be a sulfur cured polyurethane composition, on a sulfur cured diene-based rubber carcass component (6) wherein the rubber carcass component (6) itself which contains a cord or fabric (e.g. steel or glass fiber reinforced plastic) belt reinforcement (7) for dimensional stability.

It is to be appreciated that use of the tread component of the two part track in an agricultural operation presents problems not normally experienced by a toroidially-shaped pneumatic tire. In one aspect, the track has a relatively thin cross-section not supported by pneumatic air pressure as would be experienced by a pneumatic tire. Further, the track inherently presents a large footprint on the ground whereas a toroidal pneumatic tire presents a relatively small footprint.

Indeed, the track tread presents special problems and challenges as it propels a vehicle over what is usually a relatively harsh environment comprising a ground which may contain various agricultural chemicals as well as crop stubble which can abrade away or even puncture the surface the track tread.

Accordingly, the two part track of this invention can present a special utility in that, when the tread component wears it can be replaced and greatly extends the useful life of the carcass component and thereby renews life of the two part track itself, albeit with a new tread component.

It is contemplated that such advantage may be realized where the tread component is simply physically interlocked with the carcass component in that the tread can be simply removed from the carcass and a new tread component fitted to the existing carcass component.

Alternatively, where an adhesive layer is positioned as an interface between the inner surface of the tread component and the inner surface of the carcass component, the tread component may be ground away to the surface of the inner surface of the carcass component, a new adhesive layer applied to the resulting inner surface of the carcass component, and a new tread component applied thereto to form a new two part track assembly. Uniquely, said adhesive layer, where original or secondarily applied after the tread component is abraded away, may be colored with a color other than black, so that it becomes an indicator to indicate excessive wear of the tread component, or more significantly, as an indicator to indicate the limit of buffing (abrading) away of the tread component to expose the inner surface of the carcass component. In essence, the two part track may be thereby retreaded.

Accordingly, in one aspect of the invention, it is contemplated that a two-part vehicular track with a tread component of a polyurethane composition with its extended, spaced apart lugs designed to be ground engaging is a novel, adaptable, approach to such a vehicular track environment, particularly where it has the support and backing of a rubber carcass. A unique advantage of a polyurethane composition for said tread component is that it may be readily colored with a colorant, particularly with a colored pigment of a color other than black, to provide a two part track with a customized tread color.

It is considered herein that a two part vehicular track of a rubber carcass/tread component construction, particularly for a tread component of polyurethane composition, where (1) the tread component contains spaced apart raised lugs designed to be ground engaging on its circumferential outer surface combined with (2) said tread being chemically bonded to and/or physically interlocked with a surface of said track rubber carcass component is novel, inventive and a departure from past practice.

The following Example is presented in order to illustrate the invention and is intended to be only exemplary. The parts and percentages are by weight unless otherwise indicated.

EXAMPLE I

TABLE 1

Polyurethane Preparation (Formulations)

| Compound Sample | A | B | C | D | E | F |
|---|---|---|---|---|---|---|
| Ethylene glycol adipate/diphenyl methane-4,4'-diisocyanate prepolymer (NC) 6.6%) | 0 | 0 | 0 | 0 | 0 | 1200 |
| Polyethylene (1870) glycol adipate | 0 | 0 | 0 | 0 | 935 | 0 |
| Polypropylene glycol | 1040 | 2290.7 | 520 | 520 | 0 | 0 |
| Polypropylene glycol | 0 | 4558.6 | 800 | 0 | 0 | 0 |
| Diethylene glycol adipate | 0 | 0 | 0 | 1000 | 0 | 0 |
| Diethylene glycol phthalate | 0 | 0 | 300 | 0 | 0 | 0 |
| 80/20 2,6-; 2,4-toulene diisocyanate mixture | 0 | 1618 | 0 | 0 | 191.4 | 0 |
| Diphenylmethane-1,4'-diisocyanate | 625 | 0 | 545 | 504 | 0 | 0 |
| Trimethylol propane | 0 | 0 | 0 | 0 | 0 | 4.3 |
| 2,6-Ditertiary butyl pracresol | 10 | 68 | 15 | 15 | 0 | 0 |
| Stannous octoate solution (10% solution in 1000 mw ethylene glycol adipate or polypropylene glycol) | 0.1 | 0 | 0 | 0 | 0 | 0.13 |
| 4,4'-methylene bis orthochloroaniline | 0 | 0 | 0 | 0 | 129.5 | 0 |
| Hydroxyethyl hydroquinone | 0 | 0 | 0 | 0 | 0 | 165.72 |
| 1,3-Propane diole | 108.9 | 0 | 0 | 0 | 0 | 0 |
| Sodium chloride complex of 4,4'-methylene dianiline in dioctyl phthalate | 0 | 1785.6 | 409.8 | 378.8 | 0 | 0 |

TABLE 2

OH/Amine and OH/Isocyanate Group Ratios

| Example Value | A | B | C | D | E | F |
|---|---|---|---|---|---|---|
| OH/NCO ratio (estimate) | 2.5 | 2.05 | 2.08 | 2.01 | 2.2 | 3.4 |
| OH/amine group level | 0.95 | 0.85 | 0.85 | 0.85 | 0.85 | 0.91 |
| Prepolymer temperature | 104 | 91 | 93 | 93 | 105 | 105 |
| Curative temperature | 93 | 38 | 35 | 35 | 110 | 120 |
| Curing temperature | 121 | 121 | 121 | 121 | 110 | 121 |
| Pot life (minutes) | 4 | 3.5 | 2 to 3 | 2 to 3 | 2.5 | 4 to 5 |

TABLE 3

Physical Properties

| Compound Data | A | B | C | D | E | F |
|---|---|---|---|---|---|---|
| Shore A hardness | 87 | 86 | 93 | 90 | 87 | 94 |
| Shore D hardness | 30 | 30 | 37 | 35 | 0 | 44 |
| Modulus | | | | | | |
| 25° C., 100% | 1130 | 670 | 1180 | 1050 | 914 | 1590 |
| 25° C., 300% | 2480 | 1170 | 1670 | 1550 | 1804 | 2360 |
| 25° C., 500% | 0 | 1970 | 2120 | 2100 | 4827 | 3250 |
| Ultimate tensile (psi) | 3050 | 2020 | 2890 | 3175 | 5400 | 4130 |
| Ultimate elongation | 376 | 510 | 660 | 635 | 508 | 600 |
| 30% Compression (hysteresis) (% loss) | 12 | 32.7 | 27 | 28 | 19.3 | 24 |
| Compression set (%) ASTM D-935 | 45 | 39.8 | 16.8 | 22 | 23.2 | 26.2 |

TABLE 3-continued

Physical Properties

| Compound Data | A | B | C | D | E | F |
|---|---|---|---|---|---|---|
| Method B | | | | | | |
| Crescent tear (ASTM D-624) Die C (lb/in) | 375 | 323 | 503 | 500 | 464 | 746 |
| 30% Compression load deflection (lbs/in. sup. 2) | 1000 | 800 | 1825 | 1408 | 1110 | 2040 |
| Goodrich flex life (modified) ASTM-D623 with time (min) 435 psi load | 15+ | 5 | 15+ | 15+ | 42.5 | 5 |
| Heat rise (° F.) at 38° C. | 145 | 174 | 164 | 159 | 176 | 169 |
| Softening Point (° C.) | 178 | 209 | 200 | 210 | 214 | 216 |
| Melting point (° C.) | 188 | 279 | 280 | 280 | 251 | 222 |
| Tire Test (15" × 5" × 11¼" Tire) | | | | | | |
| Resiliometer results load at failure (lbs) | 6600 | 6600 | 5500 | 7700 | 6600 | 6600 |
| Time (hours) | 32 | 31.7 | 35.6 | 78.5 | 38.5 | 57 |

EXAMPLE II

TABLE 4

Millable Polyester Polyurethane
Millathane 76 Blended with Polyisoprene in a Model Compound

| Compound Samples | G | H |
|---|---|---|
| Polyisoprene | 100 | 75 |
| Millathane 76 | — | 25 |
| Carbon black (N121) | 49 | 49 |
| Wax | 1.5 | 1.5 |
| 6PPD | 2.5 | 2.5 |
| TMQ | 1 | 1 |
| Stearic acid | 2 | 2 |
| Zinc oxide | 4 | 4 |
| TBBS | 0.8 | 0.8 |
| Sulfur | 1 | 1 |
| PVI | 0.2 | 0.2 |
| Rheometer | | |
| T-25 | 8.87 | 6.78 |
| T-90 | 12.32 | 11.05 |
| Minimum torque | 2.91 | 2.81 |
| Maximum torque | 14.36 | 16.4 |
| Cure rate index (CRI) | 28.98 | 23.42 |
| Tensile strength (MPa) | 23.15 | 17.93 |
| Ultimate Elongation | 569 | 542 |
| 300% modulus | 8.49 | 8.72 |
| Peel adhesion | 40.6 | 49.4 |
| Peel adhesion, aged 5 days @ 100° C. | 22.84 | 36.44 |
| Shore A hardness (23° C.) | 60 | 67 |
| Zwick rebound (100° C.) | 91 | 52 |
| Penetration energy needle Penetration/mm 0 to 20 mm (n) | 3.22 | 4.1 |
| Dynamic Modulus | | |
| E' (MPa), 0° C. | 24.8 | 27.5 |
| E" | 2.87 | 4.23 |
| Tan delta | 0.116 | 0.154 |

TABLE 5

Millable Polyester Polyurethane
Millathane 76 Blended with Emulsion SBR in a Model Compound

| Compound Samples | I | J |
|---|---|---|
| SBR 1502 | 100 | 75 |
| Millathane 76 | 0 | 25 |
| Carbon black (N121) + C24 | 49 | 49 |
| Wax | 1.5 | 1.5 |

TABLE 5-continued

Millable Polyester Polyurethane
Millathane 76 Blended with Emulsion SBR in a Model Compound

| Compound Samples | I | J |
|---|---|---|
| 6PPD | 2.5 | 2.5 |
| TMQ | 1 | 1 |
| Stearic acid | 2 | 2 |
| Zinc oxide | 4 | 4 |
| TBBS | 0.8 | 0.8 |
| Sulfur | 1 | 1 |
| PVI | 0.2 | 0.2 |
| Rheometer | | |
| T-25 | 15.48 | 13.05 |
| T-90 | 26.48 | 20.91 |
| Minimum torque | 2.51 | 2.8 |
| Maximum torque | 13.11 | 14.6 |
| Tensile strength (MPa) | 19.17 | 18.6 |
| Ultimate Elongation | 658 | 484 |
| 300% modulus | 6.69 | 10.89 |
| Shore A hardness (23° C.) | 70.6 | 73.3 |
| Zwick rebound (100° C.) | 46 | 47 |
| Fatigue to failure (×100) | 1343 | 1400 |
| Penetration energy needle Penetration/mm 0 to 20 mm (n) | 4.95 | 5.68 |
| Dynamic Modulus | | |
| E' (MPa), 0° C. | 44.9 | 82.7 |
| E" | 7.18 | 117.6 |
| Tan delta | 0.16 | 0.213 |

While certain representative embodiments and details have been shown or illustrated for the purpose of illustrating the invention, it will be apparent to those skilled in this art that various changes and modifications may be made therein without departing from the spirit or scope of the invention.

What is claimed is:

1. An endless rubber track designed to encompass at least one drive wheel and at least one driven wheel of an associated vehicle is provided wherein said track is a two part track comprised of a pre-cured polyurethane based outer tread component having an outer surface and an opposing inner surface and a pre-cured underlying rubber carcass component having an inner surface and an opposing outer surface, wherein said pre-cured tread outer surface is configured with raised, spaced apart lugs designed to be ground engaging, wherein said pre-cured tread inner surface is physically interlocked with said carcass inner surface and wherein said carcass outer surface is designed to engage at least one of said drive wheels and/or driven wheels of said vehicle;

wherein said physical interlocking of said pre-cured tread inner surface with said pre-cured carcass inner surface is accomplished by providing:

(A) lugs in the inner surface of the pre-cured rubber carcass and opposing grooves in the complementary inner surface of the pre-cured polyurethane tread, and/or (B) grooves in the inner surface of the pre-cured rubber carcass and opposing lugs in the complementary inner surface of the pre-cured polyurethane tread.

2. The track of claim 1 wherein said rubber carcass component contains a plurality of lugs in its outer surface which are designed to engage and/or to be guided by one or more of said vehicular drive and/or driven wheels.

3. The track of claim 1 wherein said pre-cured polyurethane tread is a pre-cured sulfur curable polyurethane which contains carbon-to-carbon double bonds therein.

4. The track of claim 1 wherein said pre-cured polyurethane tread is a pre-cured blend of sulfur curable polyurethane and sulfur curable diene-based rubber.

5. The track of claim 4 wherein said diene-based rubber for said polyurethane tread pre-cured blend is selected from at least one of polymers of isoprene and/or 1,3-butadiene and copolymers of styrene with isoprene and/or 1,3-butadiene.

6. The track of claim 5 wherein said rubber is selected from at least one of cis 1,4-polyisoprene cis 1,4-polybutudiene, styrene/butadiene copolymers isoprene/butadiene copolymers, styrene/isoprene copolymers and styrene/isoprene/butadiene terpolymer.

7. The track of claim 4 wherein said pre-cured polyurethane is a pre-cured blend of a sulfur curable polyurethane and rubber compounding ingredients including sulfur.

8. The track of claim 1 wherein said pre-cured polyurethane is prepared by a reaction of diisocyanate, polymeric polyol and curative, wherein said diisocyanate is selected from methylene bis(4-phenylisocyanate) or MDI, 4,4'-diphenylmethane diisocyanate or TODI, trimethyl hexamethylene diisocyanate or TMDI, or hexamethylene diisocyanate or $H_{12}MDI$.

9. The track of claim 8 wherein said pre-cured polyurethane contains a trifunctional polymeric polyol.

10. The track of claim 1 wherein said pre-cured polyurethane is prepared by a reaction of diisocyanate, polymeric polyol and curative, wherein said polymeric polyol is selected from at least one of polyester polyols, polyether polyols, polybutadiene polyols, polycaprolactam, and functional liquid diene prepolymers.

11. The track of claim 8 wherein said polyol is selected from at least one of polyester polyols, polyether polyols, polybutadiene polyols, polycaprolactam, and functional liquid diene prepolymers.

* * * * *